Apr. 24, 1923.

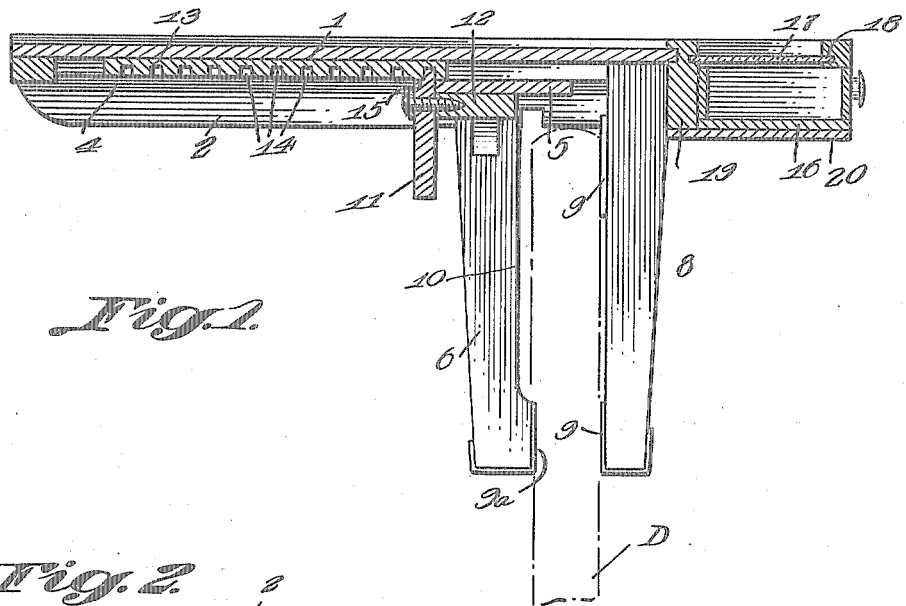

R. RUFFIN, JR

TABLE

Filed Oct. 28, 1922

R. Ruffin, Jr., Inventor

By C. A. Snowles, Attorneys

Patented Apr. 24, 1923.

1,453,186

UNITED STATES PATENT OFFICE.

ROBERT RUFFIN, JR., OF COMO, MISSISSIPPI.

TABLE.

Application filed October 28, 1922. Serial No. 597,575.

*To all whom it may concern:*

Be it known that I, ROBERT RUFFIN, Jr., a citizen of the United States, residing at Como, in the county of Panola and State of Mississippi, have invented a new and useful Table, of which the following is a specification.

This invention relates to tables, and more particularly to tables for use in automobiles. The object of the invention is to provide means for quickly, securely and conveniently serving drinks or food to the occupants of an automobile, and which may also be used as a writing table and when not in use in an automobile may perform the ordinary function of a stand or small table.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section of the table constituting this invention shown applied, the door in connection with which it is used being also in section.

Fig. 2 is a bottom plan view of the table detached.

Figure 3:
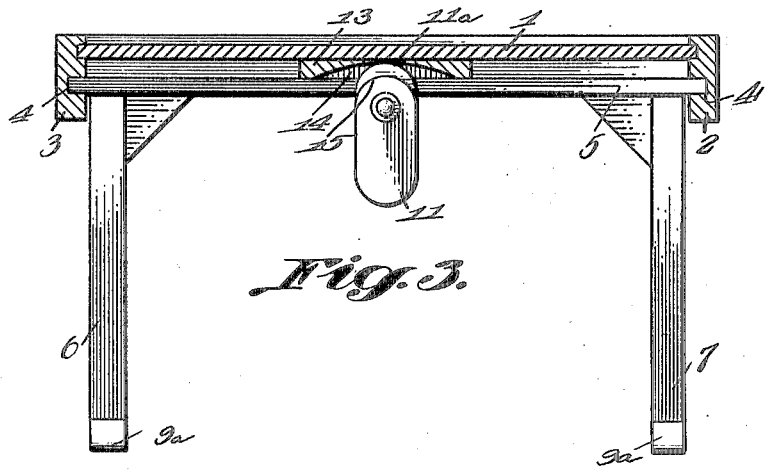
Fig. 3 is a transverse section of the table.
Figure 4:
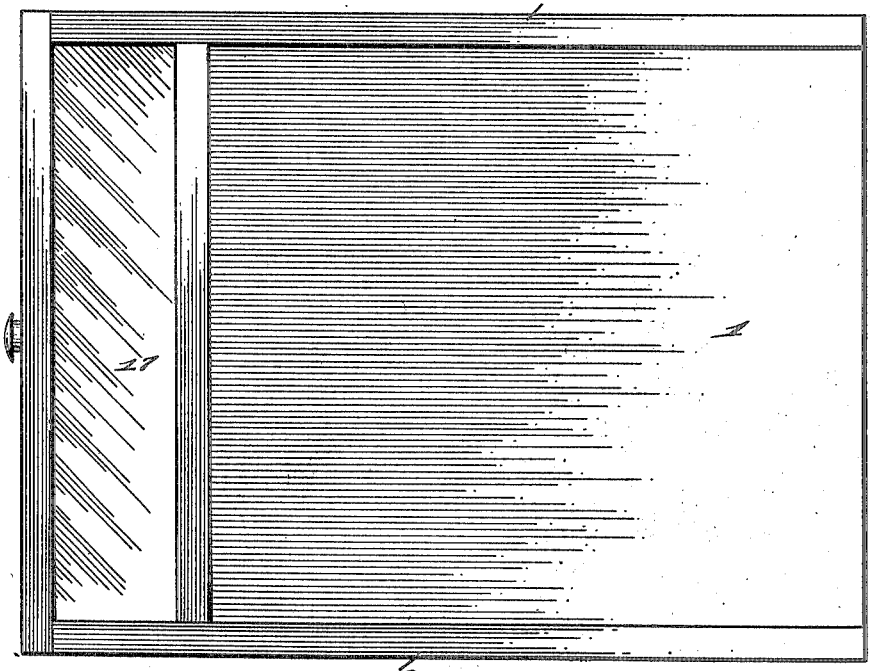
Fig. 4 is a top plan view thereof.

In the embodiment illustrated, a table top 1 is shown having side bars 2 and 3 on its lower face which are longitudinally grooved as shown at 4 to form guides for a sliding leg carrying section 5. This section 5 has suitably braced legs 6 and 7 depending from its opposite ends and which are designed to cooperate with fixed legs 8 carried by the top member 1 preferably at points spaced inwardly from one end of said top. The fixed legs 8 are equipped with anti-abrading devices 9 which may be of felt or rubber and which are designed to contact with the outer face of an automobile door D and prevent scratching of the door when the legs are so mounted. The movable legs 6 and 7 which are adjustable toward and away from the fixed legs 8 have their inner faces cut out as shown at 10 for a portion of their length and are equipped at their lower ends with facing felts or rubbers 9ª which contact with the inner face of the automobile door D when the table is in operative position, the lower ends of said legs operating to clamp the door between them and the legs 8 and are held in this position by means, presently to be described.

The slide 5 which carries the clamping legs 6 and 7 is also equipped with a locking latch 11, here shown pivotally mounted on a cross bar or cleat 12, secured to the lower face of the slide 5. This latch 11 is designed to cooperate with a fixed member 13 carried by the lower face of the table top for locking the slide in adjusted position. The member 13 is here shown in the form of a transversely grooved board, the grooves 14 of which are spaced longitudinally from each other and extend transversely of the board, said grooves being preferably deeper at their central portions and tapering toward their ends to facilitate the engagement of the latch member therewith. The latch member 11 is provided on one face adjacent its locking end with a shoulder 15 which is concentric with the rounded end 11ª of the latch and is designed to engage the outer face of the board 13 when in operative position to hold the latch in the groove 14, whereby the slide 5 is locked in adjusted position.

It will thus be seen that this sliding lock carrying member 5 may be positioned at any desired point on the lower face of the table top 1 to suitably space the legs 6 and 7 to adapt them to clampingly secure the table to the door D.

A drawer 16 is mounted in the outer end of the table 1 and when the table is in operative position on the door D projects beyond the outer face of said door as is shown clearly in Fig. 1. This drawer is designed to contain mints or any other articles which may be displayed through a cover 17 of glass which is arranged over the drawer, being surrounded by a suitable reinforcing frame 8. This drawer 16 is mounted in a compartment formed by a transversely extending partition 19 secured to the lower face of the table top 1 and a horizontally disposed partition 20 is nailed or otherwise secured to the transverse partition 19 and to the side bars 2 and 3 of the table top.

In the use of this table, when applied to an automobile door, the legs 8 are arranged adjacent the outer face of the door and the clamping legs 6 and 7 are positioned in contact with the inner face of the door as shown in Fig. 1, and are secured in this position by turning the locking latch or button 11 into the position shown in Figs. 1 and 3, which causes the rounded end 11ª thereof to enter one of the grooves 14 and the shoulder 15 contacting with the board 13, outside said grooves will lock the latch in adjusted position and thus securely hold the side 5 against movement until the latch is manually released.

While this table is primary intended for the use of tourists in serving food and drink obviously, it may be used for writing or other purposes, and when not applied to the door may be removed from the automobile and used as an ordinary table or stand by positioning the slidable legs 6 and 7 at a point spaced suitably from the fixed legs 8 to properly support the table.

I claim:—

1. A table of the class described comprising a top having a pair of laterally spaced fixed legs depending therefrom, a slide movable toward and away from said fixed legs and having a pair of legs fixed thereto and movable therewith, a transversely grooved board secured to the lower face of said table and a pivotal latch carried by said slide to enter one of the grooves in said board and lock the slide in adjusted position.

2. A table of the class described comprising a top having a pair of laterally spaced fixed legs depending therefrom, a slide movable toward and away from said fixed legs and having a pair of legs fixed thereto and movable therewith, a transversely grooved board secured to the lower face of said table, and a pivoted latch carried by said slide to enter one of the grooves in said board and lock the slide in adjusted position, said latch having means for engaging the board to lock it in adjusted position.

3. A table of the class described comprising a top having a longitudinally arranged rack board on its lower face provided with a plurality of transversely extending longitudinally spaced grooves, said grooves being deeper at their centers and tapering toward their ends, a fixed leg depending from said table top, a leg mounted to slide on said top to cooperate with said fixed leg to clampingly secure the table to a support, and a pivoted latch carried by said movable leg to engage one of said grooves in said rack board to lock the movable leg in adjusted position.

In testimony that I claim the foregoing as my own, I have hereto affixed my signature in the presence of two witnesses.

ROBERT RUFFIN, Jr.

Witnesses:
W. J. SINCLAIR,
HENRY FYFE.